(12) United States Patent
Gass (10) Patent No.: US 6,543,828 B1
(45) Date of Patent: Apr. 8, 2003

(54) PROJECTION WELDED PANEL SPACER AND METHOD FOR MAKING THE SAME

(75) Inventor: Bruno Gass, Stouffville (CA)

(73) Assignee: Magna International Inc., Aurora (CA)

( * ) Notice: Subject to any disclaimer, the term of this patent is extended or adjusted under 35 U.S.C. 154(b) by 37 days.

(21) Appl. No.: 09/709,322

(22) Filed: Nov. 13, 2000

Related U.S. Application Data (62) Division of application No. 09/191,191, filed on Nov. 13, 1998, now Pat. No. 6,188,039.
(60) Provisional application No. 60/066,105, filed on Nov. 17, 1997.

(51) Int. Cl.[7] .............................. B62D 24/04; F16D 1/00
(52) U.S. Cl. .......................... 296/35.1; 298/29; 298/30; 403/270; 403/408.1
(58) Field of Search ................................ 296/35.1, 35.3, 296/29, 30; 403/270–272, 408.1

(56) References Cited

U.S. PATENT DOCUMENTS

| | | | |
|---|---|---|---|
| 1,042,885 A | 10/1912 | Budd et al. | |
| 1,189,856 A | 7/1916 | Murray | |
| 1,206,885 A | 12/1916 | Murray | |
| 1,215,965 A | 2/1917 | Murray | |
| 1,411,340 A | * 4/1922 | Gail | 219/107 |
| 1,433,860 A | * 10/1922 | Spencer | 403/267 |
| 1,630,338 A | * 5/1927 | Gail | 403/271 |
| 1,648,539 A | 11/1927 | Chamberlin | |
| 2,051,216 A | 8/1936 | Jones et al. | |
| 2,056,563 A | 10/1936 | Budd et al. | |
| 2,060,970 A | * 11/1936 | Belden | 16/404 |
| 2,108,795 A | 2/1938 | Budd | |
| 2,814,717 A | 11/1957 | Hardesty | |
| 2,814,718 A | 11/1957 | Hardesty et al. | |
| 2,876,333 A | 3/1959 | Argentin | |
| 2,926,761 A | 3/1960 | Herbert, Jr. | |
| 3,251,127 A | 5/1966 | Tonelli | |
| 3,452,424 A | 7/1969 | Morris | |
| 3,452,425 A | 7/1969 | Gartner et al. | |
| 3,562,478 A | 2/1971 | Bennet et al. | |
| 3,563,183 A | * 2/1971 | Rich | 108/57.31 |
| 4,051,786 A | * 10/1977 | Nordgren | 108/57.31 |
| 4,060,706 A | 11/1977 | Karls | |
| 4,083,221 A | 4/1978 | Whitted | |
| 4,269,443 A | * 5/1981 | Farmer | 296/35.3 |
| 4,362,921 A | 12/1982 | Rudd | |
| 4,384,531 A | * 5/1983 | Spurgeon | 108/57.17 |
| 4,611,669 A | * 9/1986 | Ballard | 172/545 |

(List continued on next page.)

FOREIGN PATENT DOCUMENTS

| GB | 218701 A | * 2/1987 | ................ 296/35.1 |
|---|---|---|---|

Primary Examiner—D. Glenn Dayoan
Assistant Examiner—Greg Blankenship
(74) Attorney, Agent, or Firm—Pillsbury Winthrop LLP

(57) ABSTRACT

A method for making a spacer assembly comprises: forming a plurality of projections along an edge of a portion of sheet metal; roll forming the portion of sheet metal into a tubular configuration; positioning the roll formed portion of sheet metal and a metal base member to which the roll formed portion of sheet metal is to be welded in a discharge welding apparatus having a pair of electrodes so that the projections of the roll formed portion of sheet metal contact a surface of the metal base member; providing a force so that the projections are disposed in forcible engagement with the surface of the metal base member; and supplying an electrical current between the pair of electrodes and through the roll formed portion of sheet metal and the metal base member so that the projections reach a molten metal stage and are subsequently solidified to enable the roll formed portion of sheet metal to be welded to the metal base member.

6 Claims, 6 Drawing Sheets

U.S. PATENT DOCUMENTS

| | | | |
|---|---|---|---|
| 4,641,467 A | * | 2/1987 | Dupuis, Jr. .................. 52/297 |
| 4,702,510 A | * | 10/1987 | Davis ........................ 296/35.3 |
| 4,724,293 A | | 2/1988 | Bertels |
| 4,760,234 A | | 7/1988 | Urech et al. |
| 4,760,237 A | | 7/1988 | Mizukado et al. |
| 4,863,214 A | | 9/1989 | Kranis, Jr. |
| 5,077,459 A | | 12/1991 | Heumiller |
| 5,113,054 A | | 5/1992 | Hund et al. |
| 5,190,207 A | * | 3/1993 | Peck et al. .................. 228/170 |
| 5,587,092 A | | 12/1996 | Sullivan et al. |
| 5,645,738 A | | 7/1997 | Cecil |

* cited by examiner

PROJECTION WELDED PANEL SPACER AND METHOD FOR MAKING THE SAME

This is a division of application Ser. No. 09/191,191, filed Nov. 13, 1998 now U.S. Pat. No. 6,188,039.

This application claims the benefit of Provisional Application No. 60/066,105, filed Nov. 17, 1997.

FIELD OF THE INVENTION

The present invention relates to spacers used in motor vehicle bodies.

BACKGROUND OF THE INVENTION

In the automotive industry, spacers are used for various applications. For example, spacers have been used to support or reinforce a cross frame support structure which supports a truck bed on the vehicle frame. Conventionally, such spacers would be cut from a pipe or tube stock and mig welded to a plate member and positioned to assist the cross frame support in supporting the truck bed on the vehicle frame.

A shortcoming of this prior art construction is that mig welding requires extreme heat, which causes deformation of parts. In addition, mig welding is a relatively slow, cumbersome, and inefficient operation. In addition, the conventional spacers are not cost-effective from a materials point of view, as they utilize relatively expensive welded seam or seamless tubing.

It is an object of the present invention to overcome the disadvantages of the prior art noted above.

Accordingly, the present invention provides a method for making a spacer assembly comprises: forming a plurality of projections along an edge of a portion of sheet metal; roll forming the portion of sheet metal into a tubular configuration; positioning the roll formed portion of sheet metal and a metal base member to which the roll formed portion of sheet metal is to be welded in a discharge welding apparatus having a pair of electrodes so that the projections of the roll formed portion of sheet metal contact a surface of the metal base member; providing a force so that the projections are disposed in forcible engagement with the surface of the metal base member; and supplying an electrical current between the pair of electrodes and through the roll formed portion of sheet metal and the metal base member so that the projections reach a molten metal stage and are subsequently solidified to enable the roll formed portion of sheet metal to be welded to the metal base member.

It is a further object of the invention to provide a spacer that addresses the problems noted above. In accordance with this object, the present invention provides a projection welded panel spacer, comprising a metal base member defining an opening, and a sheet metal portion roll formed such that two opposite edges of the sheet metal portion are disposed in parallel adjacent relationship to one another so as to provide the sheet metal portion with a tubular configuration. The roll formed sheet metal portion has a plurality of stamped projections formed along a third edge thereof weldedly connected to the metal base member. A bore defined by the tubular configuration of the roll formed sheet metal portion is generally aligned with the opening in the metal base member.

It is a further object of the invention to provide a vehicle truck bed that incorporates the spacer discussed above. In accordance with this object, the present invention provides a vehicle truck bed comprising a truck bed panel, a vehicle frame structure, and a frame support disposed between the truck bed and the frame structure for mounting the truck bed panel on the frame structure. A fixing structure fixes the truck bed panel to the vehicle frame structure. The fixing structure includes a metal base member defining an opening and mounted on the cross member, and a sheet metal portion roll formed such that two opposite parallel edges of the sheet metal portion are disposed in parallel adjacent relationship to one another so as to provide the sheet metal portion with a tubular configuration. The roll formed sheet metal portion has a plurality of stamped projections formed along a third edge thereof weldedly connected to the metal base member. A bore defined by the tubular configuration of the roll formed sheet metal portion is generally aligned with the opening in the metal base member. A fastener extends through an opening in the truck bed, an opening in the frame structure, the opening in the metal base member, and the bore so as to secure the truck frame to the truck bed panel.

These and other objects, features, and advantages of this invention will become more apparent from the following detailed description when taken in conjunction with the accompanying drawings which illustrate, by way of example, the principles of this invention.

DETAILED DESCRIPTION OF THE PREFERRED EMBODIMENTS ILLUSTRATED IN THE DRAWINGS

Figure 1:
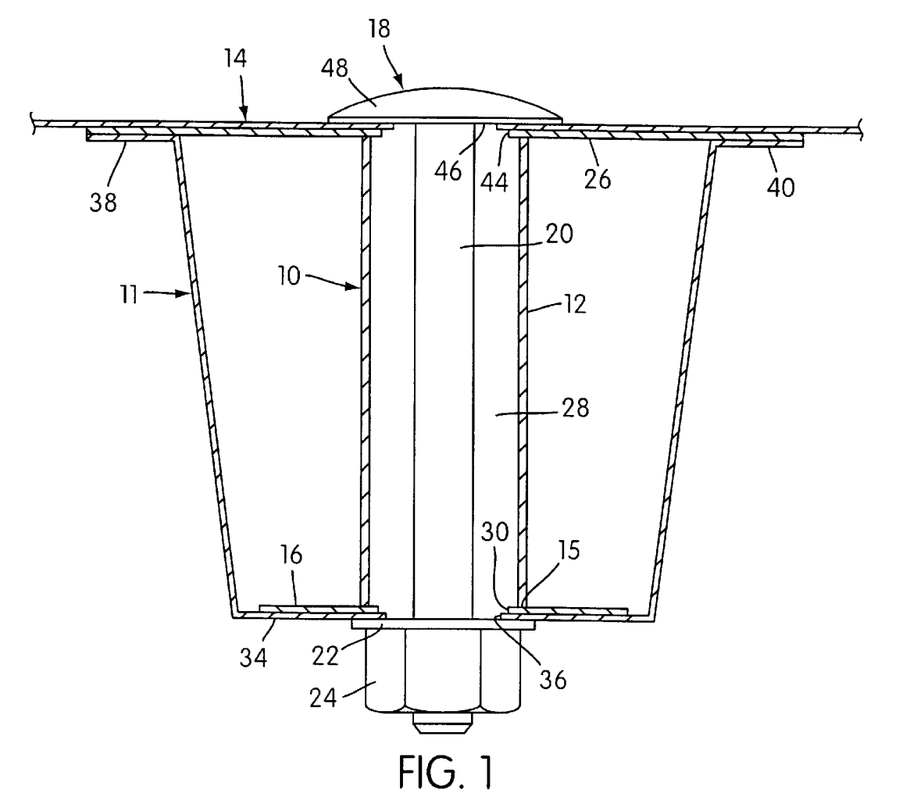
FIG. 1 is a cross-sectional view of a projection welded panel spacer in accordance with the present invention shown in operative relation between a truck bed panel and a cross frame support.

Referring more particularly now to the drawings, there is shown in FIG. 1 a panel spacer, generally indicated at 10, being used in combination with a cross frame support, generally indicated at 11, and a truck bed panel, generally indicated at 14.

The panel spacer 10 includes a spacer tube 12 welded at its lower end 15 to a metal base plate member 16. The panel spacer 10 further includes a fixing assembly, preferably in the form of a bolt assembly indicated at 18. The bolt assembly 18 preferably includes a carriage bolt 20, a washer 22, and a nut 24 threaded securely, to the threaded portion of the carriage bolt 20.

In the embodiment shown, the panel spacer 10 preferably includes an upper metal member which closes-off or "caps" the cross frame support structure 11. The upper metal member is preferably in the form of a plate 26 and facilitate securement of the truck bed panel 14 to the cross frame support structure 11. The upper metal member or plate 26 need not be fixed to the upper end spacer tube 12, and may simply rest thereupon. It is contemplated, however, that this plate 26 may be fixed by conventional welding.

Preferably, the spacer tube 12 has a generally cylindrical configuration, although the present invention contemplates tubular arrangement of other configurations, such as one with a squared configuration. The carriage bolt 20 extends through a central bore 28 through the spacer tube 12. In addition, the lower end 15 of the spacer tube 12 which is welded to the metal base plate member 16, as will be described in greater detail later, is disposed in surrounding relation to an opening or hole 30 in the base plate 16, so that a threaded portion of the carriage bolt is disposed beyond the longitudinal extent of the spacer tube 12 to receive the nut 24.

In the arrangement shown, the spacer tube 12 and the base plate member 16 welded thereto are dropped as a unit into the well or U-shaped cross-sectional configuration of the frame support 11, so that the bottom surface of the base plate member 16 can be spot welded to the bottom wall 34 of the frame support 11. The hole 30 in the base plate member 16 is aligned with a hole 36 in the bottom wall 34 of the frame support 11 before the base plate member 16 is spot welded to the wall 34.

After this welding operation, the cross frame cap 26 is mounted onto laterally outwardly projecting flanges 38 and 40 of the frame support 11 and spot welded thereto. The cap 26 has an opening 44 which is aligned with the openings or holes 30 and 36 prior to spot welding the cap 26 to the flanges 38 and 40. Next, the truck bed panel 14 is mounted on the cross frame cap 26. The bed panel 14 has an opening 46 which is in alignment with the openings 44, 30 and 36. The cross frame cap 26 provides a support surface for the truck bed panel 14.

Next, the carriage bolt 20 is passed through the openings 46, 44, 30, and 36 until the head 48 of the carriage bolt 20 engages the upper surface of the truck bed panel 14. At this point, the threaded portion of the bolt 20 has passed through the spacer tube 12, through the base plate member 16, and through the lower wall 34 of the frame support 11. The nut 24 is then secured to the threaded portion of the carriage bolt 20 and tightened in place.

By providing the panel spacer 10, the tightening of the nut 24 will not crush in or indent the truck bed panel 14 when the nut 24 is tightened to a significant extent.

Referring now to FIGS. 2–9, there is showing a method of manufacturing the panel spacer 10 in accordance with the principles of the present invention.

Figure 2:
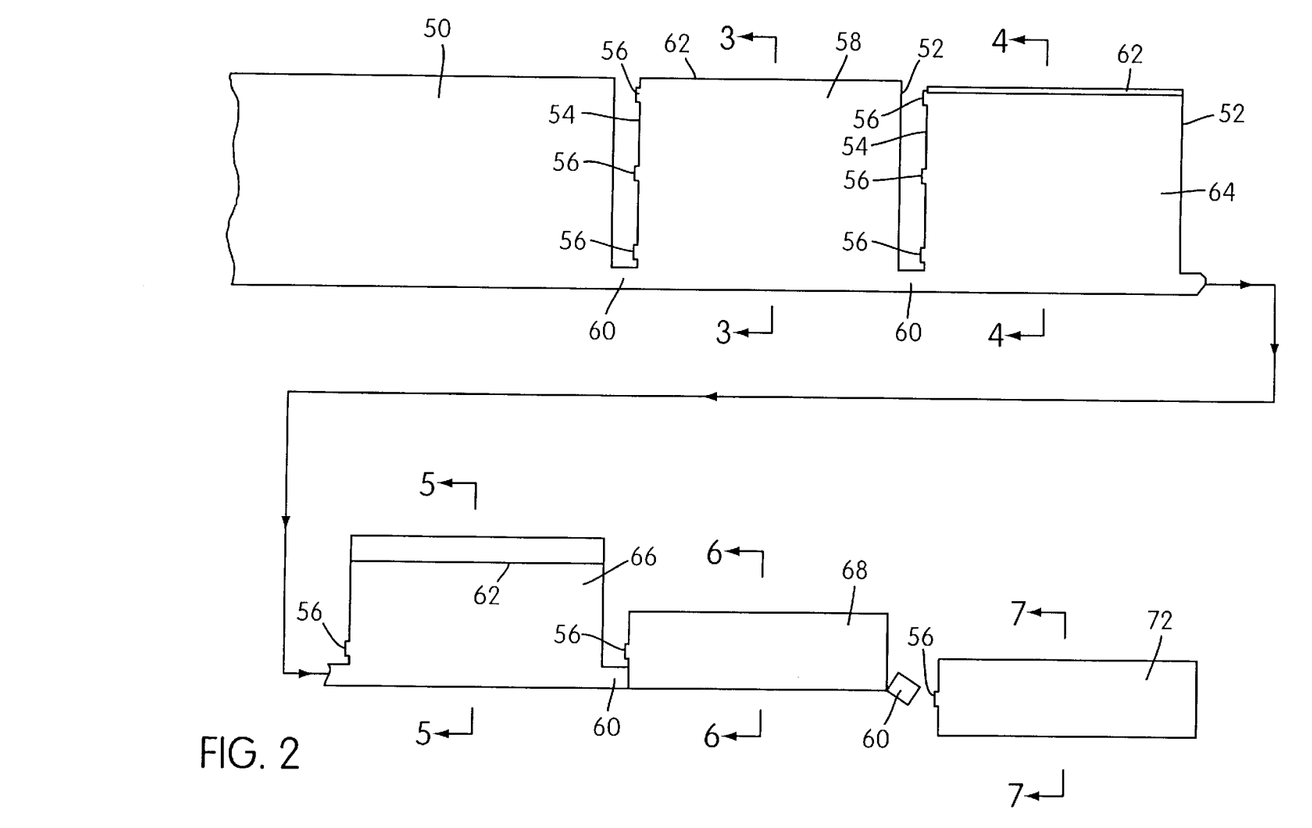
FIG. 2 is a schematic view showing the progression of sheet metal through a progressive die structure to form the spacer tube in accordance with the method of the present invention.

FIG. 2 shows the manner in which a strip of sheet metal is manipulated through a progressive die to form the spacer tube 12 with a series of circumferentially spaced projections along its lower edge. In a first die operation, a strip of sheet metal 50 is punched to form a straight forward edge 52 and a rearward edge 54 having a plurality of depending projections 56. This first stamped configuration 58 remains connected with the preceding strip of material 50 by a small interconnecting strip portion 60 at one of the corners of the material.

Figure 3:
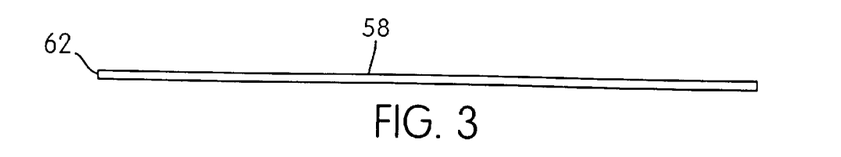
FIG. 3 is a sectional view taken through the line 3—3 in FIG. 2.
Figure 4:
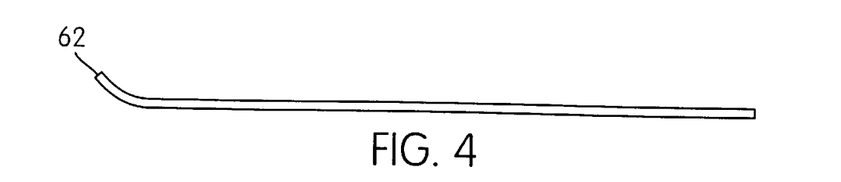
FIG. 4 is a sectional view taken through the line 4—4 in FIG. 2.
Figure 5:
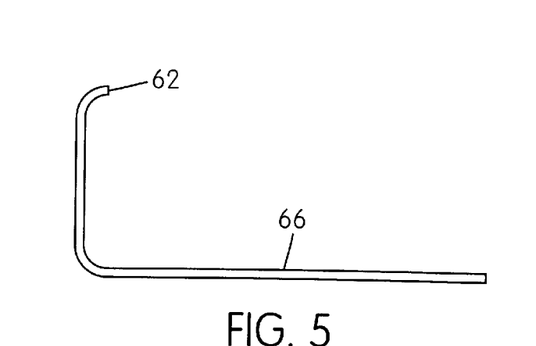
FIG. 5 is a sectional view taken through the line 5—5 in FIG. 2.

FIG. 3 is a cross-sectional view taken through the line 3—3 in FIG. 2 in the direction transverse to the direction of sheet metal movement through the progressive die. As shown in FIG. 3, the initial stamping 58 has a substantially flat cross-section.

Referring back to FIG. 2, it can be appreciated that in a subsequent configuration 64, achieved by the progressive die, a longitudinal edge 62 which extends in a longitudinal direction perpendicular to edges is slightly curled. This can be appreciated more fully from FIG. 4, which is a cross-sectional view taken through the line 4—4 in FIG. 2.

A subsequent configuration 66 of the sheet metal is shown in FIG. 2. As can be appreciated from the cross-sectional view of FIG. 5, taken through the line 5—5 in FIG. 2, the sheet metal is punched into a substantially J-cross-sectional configuration.

Referring back to FIG. 2, the sheet metal is worked into the next configuration as indicated at 68, and is generally cylindrical in form. As can be appreciated from FIG. 6, which is a cross-sectional view taken through the line 6—6 in FIG. 2, the generally cylindrical configuration 68 has an overlapping or extended portion 70 which extends beyond the edge 62.

Figure 6:
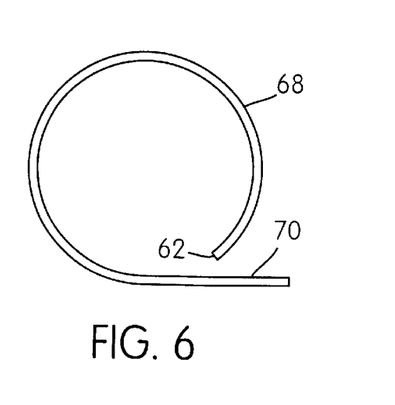
FIG. 6 is a sectional view taken through the line 6—6 in FIG. 2.
Figure 7:
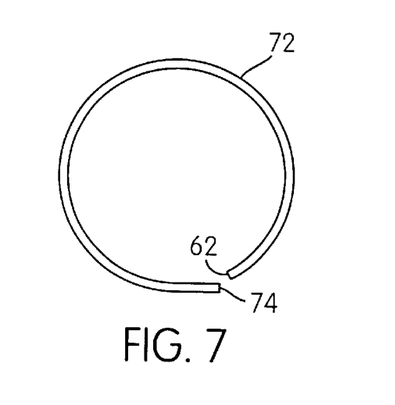
FIG. 7 is a sectional view taken through the line 7—7 in FIG. 2.

Referring back to FIG. 2, a final configuration 72 is provided. The final configuration 72 is substantially cylindrical in form. As can be appreciated from FIG. 7, which is a cross-sectional view taken through the line 7—7 in FIG. 2, the end portion 70 as shown in FIG. 6 is cut off from the final configuration so that an opposite edge 74 of the sheet metal is disposed in adjacent relation to the edge 62. While these edges 62, 74 may subsequently be brought into contact, this is not required, as these edges will not be seam welded to one another.

As can also be appreciated from FIG. 2, the connecting portion 60 which attaches to each portion of sheet metal to the previous portion of sheet metal to be formed into a spacer tube, is dislodged and discarded.

Figure 8:
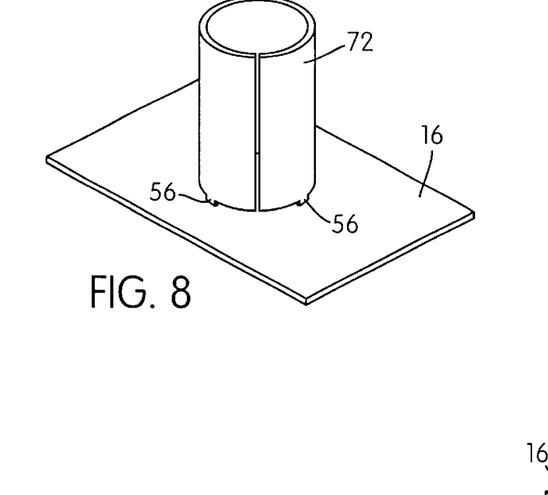
FIG. 8 is a perspective view of the spacer tube in its form immediately after formation in the progressive die and mounted upon a base plate to which the spacer tube is to be projection welded.

Referring now to FIG. 8, it can be appreciated that the general cylindrical configuration 72, which eventually forms the spacer tube 12, is placed upon the base plate 16 in accordance with the method of the present invention.

Figure 9:
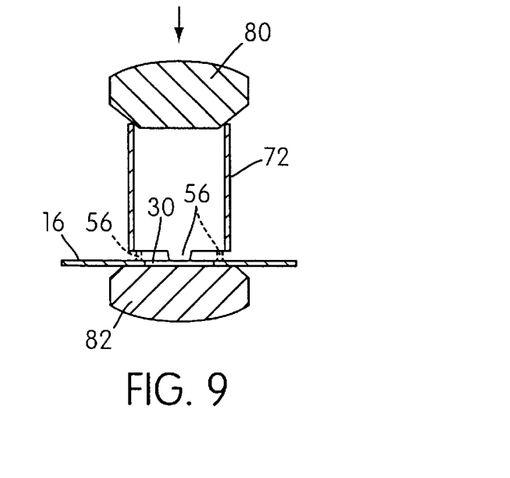
FIG. 9 is a schematic representation of the projection or resistance welding operation in which the spacer tube is welded to the spacer tube base plate.

As is illustrated in the cross-sectional view of FIG. 9, the tubular cylindrical sheet metal configuration 72 and the base plate 16 are projection welded to one another in a projection welding operation. The projection welding operation is a form of resistance welding in which the tubular cylindrical member 74 and base plate 16 are positioned in a discharge welding apparatus including a vertically movable upper electrode 80, and a stationery lower electrode 82. The tubular component 72 is forced against the base plate 16 under pressure applied by downward movement of the upper movable electrode 80. An electrical current is then passed between the upper movable electrode 80 and the lower stationary electrode 82. This causes the projections 56 to heat rapidly due to their relatively small surface areas in contact with the base plate 16. As the electrical current is passed through the projections 56, they reach the molten metal stage, as does a small portion of the base plate 16 which directly contacts the projections 56. The pressure applied by the upper movable electrode 80 then further forces the two components together and holds them in place until the molten metal fuses and cools forming a single welded component. This single component constitutes the spacer 10 and base plate 16 illustrated in FIG. 1.

Figure 10:
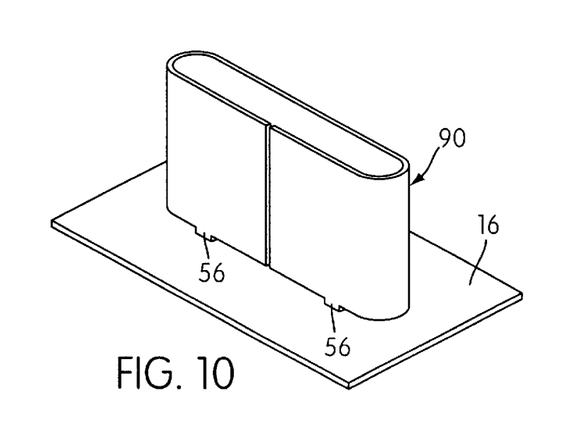
FIG. 10 is a perspective view of an oval spacer tube in conjunction with a spacer tube base plate to which the spacer tube is to be projection welded to form a panel spacer in accordance with a second embodiment of the present invention.

Shown in FIG. 10 is an alternate configuration for a tubular member, as generally indicated at 90, which is to be welded to the base plate 16. As shown, the tubular member 90 has a generally oval configuration.

In accordance with the present invention, a projection welded spacer which includes a spacer tube and base plate is formed. Because a resistance weld is used to weld the base plate 16 to the spacer tube 12, less heat is employed, causing little or no warping of the mounting surfaces. In addition, the quality of the resulting part is superior in comparison with the conventional systems in which a spacer tube is mig or arc welded to a base plate 16, as these welding operations are relatively messy and more expensive.

In addition, because the tubular member 72, including projections 56, is formed in a progressive die in the manner disclosed, the tubular component which is to be welded is significantly less expensive in comparison with arrangements in which tubular stock material would be used. In addition, unlike tubular stock material, the tubular member utilized in accordance with the present invention need not be seam welded to form a complete cylindrical configuration, as can be appreciated from the cross-sectional view of FIG. 7.

Figure 11:
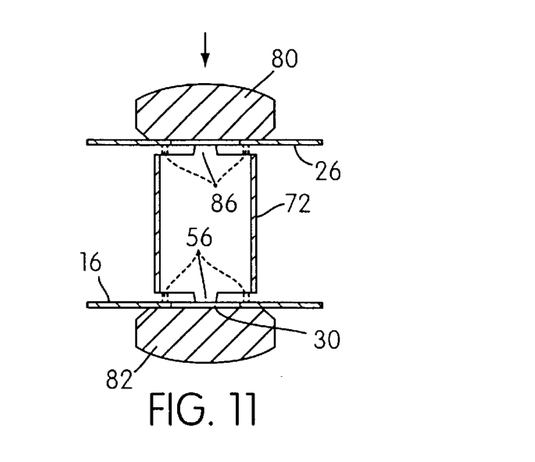
FIG. 11 is a schematic representation of a projection or resistance welding operation in which the spacer tube is simultaneously welded to the spacer tube base plate and an upper metal plate in accordance with a third embodiment of the present invention.

FIG. 11 illustrates a further embodiment for manufacturing the panel spacer 10 illustrated in FIG. 1. In the embodiment of FIG. 11, the upper plate 26 is fixed to the upper end of spacer tube 12 by a projection or resistance weld at the same time that the lower base plate is projection or resistance welded to the lower end of the spacer tube 12. In this embodiment, the sheet metal is formed substantially as described above, with the exception that a plurality of upper projections 86 are formed (stamped) on an edge opposite the lower projections 56. Preferably, the stamping of the upper projections 86 are formed concurrently with the stamping of the lower projections 56. The projections 56 and 86 enable the spacer tube 12 to be simultaneously projection welded to the base plate 16 and the upper plate 26 for added efficiency in manufacturing a panel spacer in which the upper plate 26 is to be fixed to the spacer tube 12.

As can be appreciated from FIGS. 9 and 11, for ease of manufacture, it is preferred for the openings 30 and 44 to be formed in the respective plate members 16 and 26 prior to the projection welding operation. It should also be noted that in FIGS. 9 and 11, two of the three projections 56 are illustrated in phantom for the purpose of facilitating an understanding of this invention, although only one of these three projections (the centered one) would ordinarily be visible in the cross sections taken. The same is true with respect to projections 86 in FIG. 11 and the projections illustrated in FIG. 18, discussed below. It should be understood that the three projections are merely a preferred example, and that more or less projections may be provided. Most preferably, at least three projections are provide to enable the roll formed tubular member to be balanced on the metal base member 16.

Figure 12:
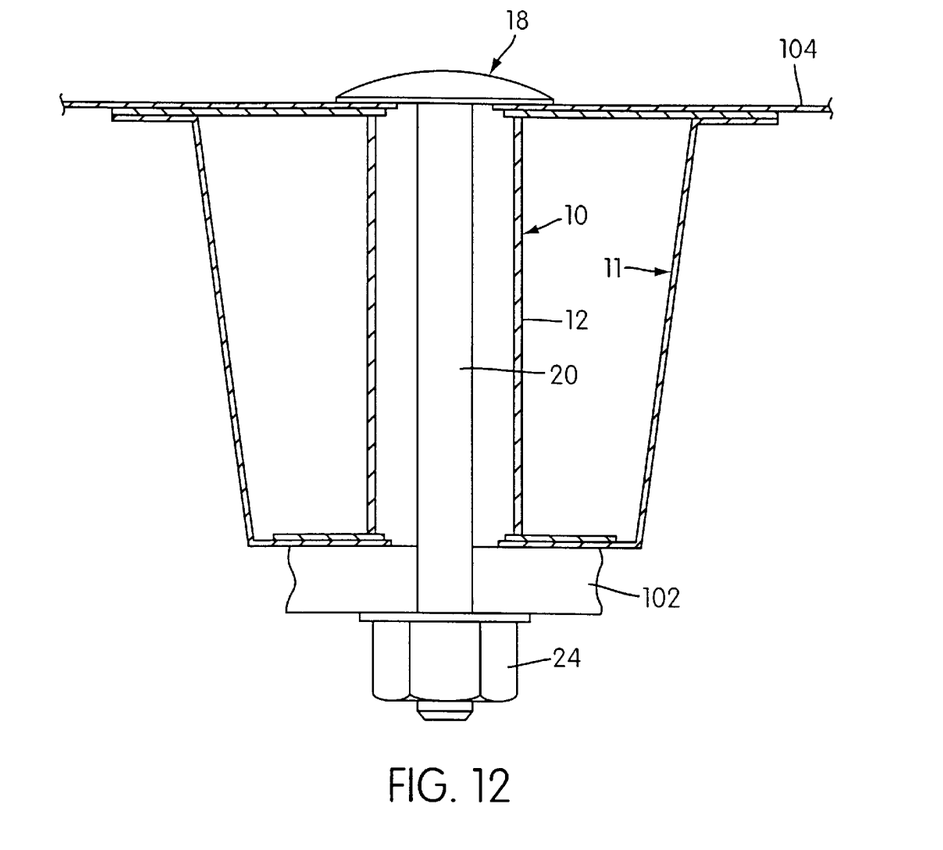
FIG. 12 is a cross-sectional view of a projection welded panel spacer in accordance the present invention shown in operative relation with a cross frame support and connecting a truck bed panel with a vehicle frame structure.

FIG. 12 is similar to FIG. 1, but illustrates the panel spacer 10 connecting the vehicle frame 102 to the panel 104 of a truck bed.

FIGS. 13–17 illustrate another embodiment of the method in accordance with the present invention.

Figure 13:
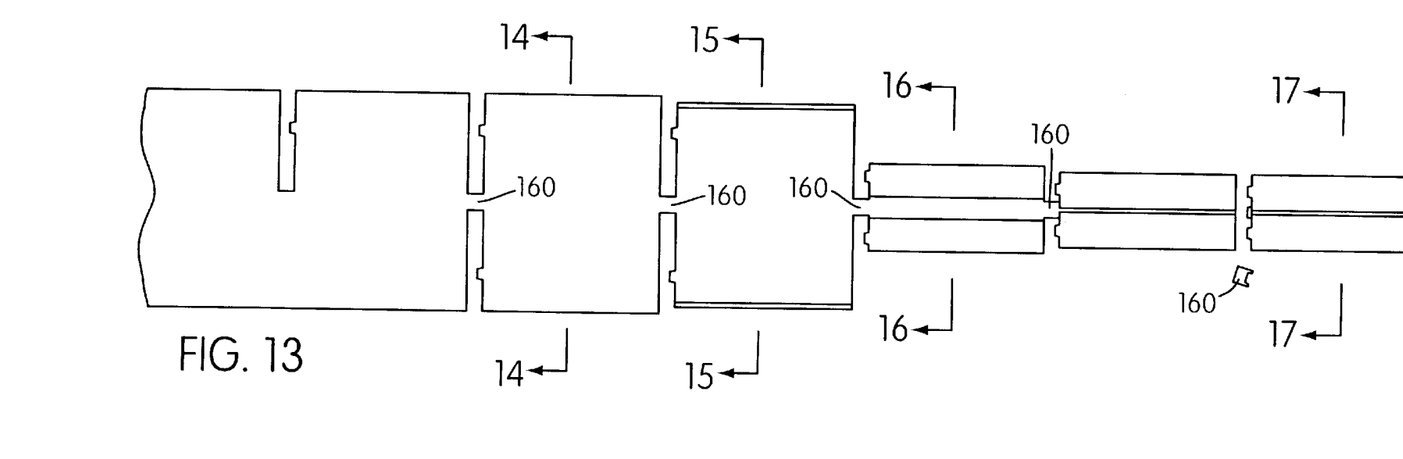
FIG. 13 is a schematic view showing the progression of sheet metal through a progressive die structure to form the spacer tube in accordance with another embodiment of the method of the present invention.
Figure 14:
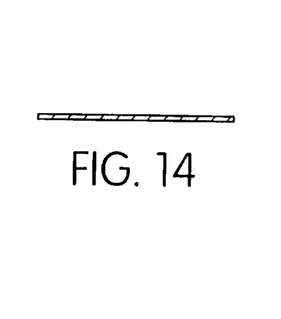
FIG. 14 is a sectional view taken through the line 14—14 in FIG. 13.

FIGS. 13–17 are similar to FIGS. 2–7 but, as can be appreciated from FIG. 13, illustrates a method in which the interconnecting strip portions 160 connect adjacent portions of sheet metal towards the centers of the adjacent edges of the respective portions of sheet metal. This is opposed to the strip portions 60 connecting the corners of the material as disclosed in FIGS. 2–7.

Figure 15:
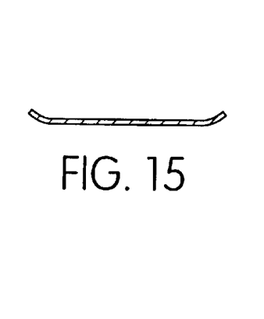
FIG. 15 is a sectional view taken through the line 15—15 in FIG. 13.
Figure 16:
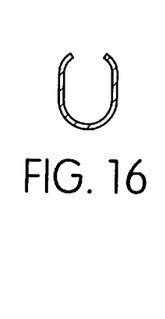
FIG. 16 is a sectional view taken through the line 16—16 in FIG. 13.
Figure 17:
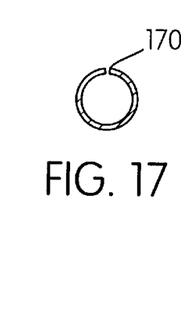
FIG. 17 is a sectional view taken through the line 17—17 in FIG. 13.

In addition, as can be best appreciated from FIGS. 15 and 16, in this embodiment, both opposite edges the sheet metal are rolled towards one another to provide the tubular configuration of the spacer tube. This is in contrast to the prior embodiment, wherein it can be appreciated from FIGS. 4 and 5 that only one edge is rolled towards the opposite edge.

As with the prior embodiment, the embodiment of FIG. 13 also contemplates that projections may be stamped on both the leading and trailing edges of the sheet metal portion to enable both ends of the roll formed tubular structure to be projection or spot welded to respective metal members (e.g, as in FIG. 11). In addition, as with the prior embodiment, it is preferred for the adjacent edges forming seam 170 in the roll formed tubular member (see FIG. 17) to be in adjacent or abutting relation with one another (the edges do not need to contact one another, although they may), and do not need to be welded. Welding would require an additional step and an additional expense that is preferably not incurred in the method of the present invention.

Figure 18:
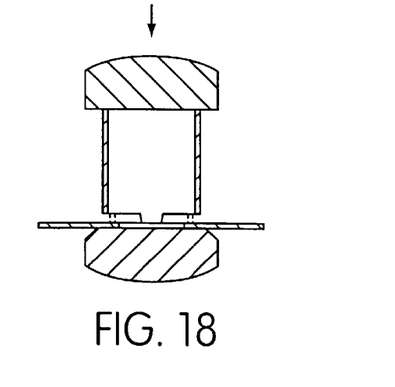
FIG. 18 is a schematic representation of the projection or resistance welding operation similar to that depicted in FIG. 9, but illustrating an upper electrode which need not be particularly adapted to the shape of the roll formed tubular member.

FIG. 18 is a schematic representation of the projection or resistance welding operation similar to that depicted in FIG. 9, but illustrating that the upper electrode need not be particularly adapted to the shape of the roll formed tubular member. Thus, the method is flexible as the same welding apparatus can be used weld many different shapes of tubular members and base plate members.

The foregoing detailed description of the preferred embodiments of this invention has been provided for the purposes of illustration and description. It is not intended to be exhaustive or to limit the invention to the precise embodiments disclosed. Other modifications and variations may be evident to practitioners in the art when considered in reference to this disclosure.

What is claimed is:

1. A spacer, comprising:
   a metal base member defining an opening;
   a sheet metal portion roll formed such that two opposite edges of said sheet metal portion are disposed in parallel adjacent relationship to one another so as to provide said sheet metal portion with a tubular configuration, said roll formed sheet metal portion having a plurality of stamped projections formed along a third edge thereof weldedly connected to said metal base member, and wherein a bore defined by said tubular configuration of said roll formed sheet metal portion is generally aligned with said opening in said metal base member.

2. A spacer according to claim 1, further comprising:

an opposite metal member welded to a fourth edge of said roll formed sheet metal portion opposite said third edge having said projections, said opposite metal member having an opening which is aligned with the bore of said roll formed sheet metal portion and the opening of said metal base member.

3. A spacer according to claim 1, wherein said parallel adjacent edges are not welded to one another.

4. A vehicle truck bed comprising:

a truck bed panel;

a vehicle frame structure;

a frame support disposed between said truck bed panel and said frame structure for mounting said truck bed panel on said frame structure; and a fixing structure which fixes the truck bed panel to the vehicle frame structure, said fixing structure including a metal base member defining an opening and mounted on said frame support;

a sheet metal portion roll formed such that two opposite parallel edges of said sheet metal portion are disposed in parallel adjacent relationship to one another so as to provide said sheet metal portion with a tubular configuration, said roll formed sheet metal portion having a plurality of stamped projections formed along a third edge thereof weldedly connected to said metal base member, and wherein a bore defined by said tubular configuration of said roll formed sheet metal portion is generally aligned with said opening in said metal base member; and a fastener extending through an opening in said truck bed panel, an opening in said frame structure, said opening in said metal base member, and said bore so as to secure said truck frame to said truck bed panel.

5. A spacer assembly comprising:

a panel;

a frame structure;

a frame support disposed between said panel and said frame structure for mounting said panel on said frame structure; and a fixing structure which fixes said panel to said frame structure, said fixing structure including a metal base member defining an opening and mounted on said frame support;

a sheet metal portion roll formed such that two opposite parallel edges of said sheet metal portion are disposed in parallel adjacent relationship to one another so as to provide said sheet metal portion with a tubular configuration, said roll formed sheet metal portion having a plurality of stamped projections formed along a third edge thereof weldedly connected to said metal base member, and wherein a bore defined by said tubular configuration of said roll formed sheet metal portion is generally aligned with said opening in said metal base member; and a fastener extending through an opening in said panel, an opening in said frame structure, said opening in said metal base member, and said bore so as to secure said frame structure to said panel.

6. A support assembly comprising:

a panel;

a frame structure having a bottom and a wall extending from said bottom; and a spacer including a metal base member defining an opening, said base member being connected to and supported by said bottom of said frame structure; and a sheet metal portion roll formed such that two opposite edges of said sheet metal portion are disposed in parallel adjacent relationship to one another so as to provide said sheet metal portion with a tubular configuration, said roll formed sheet metal portion having a plurality of stamped projections formed along a third edge thereof weldedly connected to said metal base member, and wherein a bore defined by said tubular configuration of said roll formed sheet metal portion is generally aligned with said opening in said metal base member;

said panel having an opening that is generally aligned with said opening in said metal base member, said roll formed sheet metal portion is positioned between said panel and said base member, and said wall extends between said bottom of said frame structure and said panel.

* * * * *

UNITED STATES PATENT AND TRADEMARK OFFICE
CERTIFICATE OF CORRECTION

PATENT NO.   : 6,543,828 B1                                               Page 1 of 1
DATED        : April 8, 2003
INVENTOR(S)  : Gass It is certified that error appears in the above-identified patent and that said Letters Patent is hereby corrected as shown below:

<u>Title page,</u>
Item [56], References Cited, FOREIGN PATENT DOCUMENTS, please add:
-- GB   1 269 632     04/1972
   EP   0 139 336     05/1985
   JP   63-129065     06/1988
   JP   63-316460     12/1988 --.

Signed and Sealed this

Thirtieth Day of September, 2003

JAMES E. ROGAN
*Director of the United States Patent and Trademark Office*